United States Patent
Yu et al.

(10) Patent No.: US 10,395,118 B2
(45) Date of Patent: Aug. 27, 2019

(54) SYSTEMS AND METHODS FOR VIDEO PARAGRAPH CAPTIONING USING HIERARCHICAL RECURRENT NEURAL NETWORKS

(71) Applicant: Baidu USA, LLC, Sunnyvale, CA (US)

(72) Inventors: Haonan Yu, West Lafayette, IN (US); Jiang Wang, Santa Clara, CA (US); Zhiheng Huang, Sunnyvale, CA (US); Yi Yang, San Jose, CA (US); Wei Xu, Saratoga, CA (US)

(73) Assignee: Baidu USA LLC, Sunnyvale, CA (US)

( * ) Notice: Subject to any disclaimer, the term of this patent is extended or adjusted under 35 U.S.C. 154(b) by 681 days.

(21) Appl. No.: 15/183,678

(22) Filed: Jun. 15, 2016

(65) Prior Publication Data

US 2017/0127016 A1 May 4, 2017

Related U.S. Application Data

(60) Provisional application No. 62/248,232, filed on Oct. 29, 2015.

(51) Int. Cl.
*G06N 3/04* (2006.01)
*G06K 9/00* (2006.01)
*G06N 3/08* (2006.01)

(52) U.S. Cl.
CPC ....... *G06K 9/00711* (2013.01); *G06N 3/0445* (2013.01); *G06N 3/084* (2013.01)

(58) Field of Classification Search
CPC ... G06K 9/00711; G06N 3/0445; G06N 3/084
See application file for complete search history.

(56) References Cited

PUBLICATIONS

Tieleman et al., "Lecture 6.5-rmsprop: Divide the gradient by a running average of its recent magnitude,"COURSERA: Neural Networks for Machine Learning, 4, 2012 (6pgs).
Tran et al., "C3D: generic features for video analysis," CoRR, abs/1412.0767, 2014 (10pgs).
Vedantam et al., "CIDEr: Consensus-based image description evaluation," CoRR, abs/1411.5726, 2014 (17pgs).
Venugopalan et al., "Sequence to sequence—video to text," CoRR, abs/1505.00487, 2015 (9pgs).

(Continued)

*Primary Examiner* — Austin Hicks
(74) *Attorney, Agent, or Firm* — North Weber & Baugh LLP

(57) ABSTRACT

Described herein are systems and methods that exploit hierarchical Recurrent Neural Networks (RNNs) to tackle the video captioning problem; that is, generating one or multiple sentences to describe a realistic video. Embodiments of the hierarchical framework comprise a sentence generator and a paragraph generator. In embodiments, the sentence generator produces one simple short sentence that describes a specific short video interval. In embodiments, it exploits both temporal- and spatial-attention mechanisms to selectively focus on visual elements during generation. In embodiments, the paragraph generator captures the inter-sentence dependency by taking as input the sentential embedding produced by the sentence generator, combining it with the paragraph history, and outputting the new initial state for the sentence generator.

20 Claims, 9 Drawing Sheets

(56) References Cited

PUBLICATIONS

Venugopalan et al., "Translating videos to natural language using deep recurrent neural networks," CoRR, abs/1412.4729, 2014 (11 pgs).
Vinyals et al., "A neural conversational model," CoRR, abs/1506.05869, 2015 (8pgs).
Vinyals et al., "Show and tell: A neural image caption generator," CoRR, abs/1411.4555, 2014 (9pgs).
Wang et al., "Action Recognition by Dense Trajectories," In IEEE Conference on Computer Vision & Pattern Recognition, pp. 3169-3176, Jun. 2011 (9pgs).
Wen et al., "Semantically conditioned LSTM-based natural language generation for spoken dialogue systems," CoRR, abs/1508.01745, 2015 (11pgs).
Werbos et al., "Backpropagation through time: what does it do and how to do it," In Proceedings of IEEE, vol. 78, pp. 1550-1560, 1990 (11pgs).
Bandanau et al., "Neural machine translation by jointly learning to align and translate," CoRR, abs/1409.0473, 2014 (15pgs).
Banerjee et al., "Meteor: An automatic metric for MT evaluation with improved correlation with human judgments," In Proceedings of the ACL Workshop on Intrinsic and Extrinsic Evaluation Measures for Machine Translation and/or Summarization, pp. 65-72, Jun. 2005 (8pgs).
Barbu et al., "Video in sentences out," In Proceedings of the Conference on Uncertainty in Artificial Intelligence, pp. 102-112, 2012 (11 pgs).
Bengio et al., "Scheduled sampling for sequence prediction with recurrent neural networks," CoRR, abs/1506.03099, 2015 (9pgs).
Bordes et al., "Question answering with subgraph embeddings," CoRR, abs/1406.3676, 2014 (10pgs).
Chen et al., "Collecting highly parallel data for paraphrase evaluation," In Proceedings of the 49th Annual Meeting of the Association for Computational Linguistics (ACL-2011), Portland, OR, Jun. 2011 (11pgs).
Chen et al., "Microsoft COCO captions: Data collection and evaluation server," CoRR, abs/1504.00325, 2015 (7pgs).
Chen et al.,"Mind's Eye: A recurrent visual representation for image caption generation," In Proceedings of the IEEE Conference on Computer Vision and Pattern Recognition,2015.
Cho et al., "Learning phrase representations using RNN encoder-decoder for statistical machine translation," CoRR, abs/1406.1078, 2014 (15pgs).
Das et al., "A thousand frames in just a few words: Lingual description of videos through latent topics and sparse object stitching," In Proceedings of the IEEE Conference on Computer Vision and Pattern Recognition, pp. 2634-2641, 2013 (8pgs).
Donahue et al., "Long-term recurrent convolutional networks for visual recognition and description," CoRR, abs/1411.4389, 2014 (14pgs).
Elman, Finding structure in time. Cognitive Science, 14(2):179-211, 1990 (33pgs).
Farneback, "Two-frame motion estimation based on polynomial expansion," In Proceedings of the 13th Scandinavian Conference on Image Analysis, pp. 363-370,2003 (8pgs).
Guadarrama et al., "Youtube2text: Recognizing and describing arbitrary activities using semantic hierarchies and zero-shot recognition," In ICCV'13 Int. Conf. on Computer Vision 2013, Dec. 2013 (8pgs).
Hanckmann et al., "Automated textual descriptions for a wide range of video events with 48 human actions," In Proceedings of the European Conference on Computer Vision Workshops and Demonstrations, pp. 372-380, 2012 (10pgs).
Pan et al., "Jointly modeling embedding and translation to bridge video and language," CoRR, abs/1505.01861, 2015 (9pgs).
Papineni et al., "Bleu: a method for automatic evaluation of machine translation," In ACL, pp. 311-318, 2002 (8pgs).

Rohrbach et al., "Coherent multi-sentence video description with variable level of detail," In German Conference on Pattern Recognition (GCPR), Sep. 2014 (12pgs).
Rohrbach et al., "Translating video content to natural language descriptions," In Proceedings of the IEEE International Conference on Computer Vision, pp. 433-440, 2013.
Russakovsky et al., "ImageNet large scale visual recognition challenge," International Journal of Computer Vision (IJCV), pp. 1-42, Apr. 2015 (43pgs).
Schuster et al., "Bidirectional recurrent neural networks," IEEE Transactions on Signal Processing, 45(11):2673-2681, Nov. 1997 (9pgs).
Simonyan et al., "Very deep convolutional networks for large-scale image recognition," CoRR, abs/1409.1556, 2014 (14pgs).
Srivastava et al., "Dropout: A simple way to prevent neural networks from overfitting," Journal of Machine Learning Research, 15:1929-1958, 2014 (30pgs).
Sun et al., "Semantic aware video transcription using random forest classifiers," In Proceedings of the European Conference on Computer Vision, pp. 772-786,2014 (16pgs).
Sutskever et al., "Sequence to sequence learning with neural networks," CoRR, abs/1409.3215, 2014 (9pgs).
Yu et al., "Video Paragraph Captioning using Hierarchical Recurrent Neural Networks",<URL: http://arxiv.org/pdf/1510.07452v1.pdf, Oct. 26, 2015 (11 pgs).
Xu et al.,"A multi-scale multiple instance video description network", CoRR, abs/1505.05914, 2015 (14 pgs).
Xu et al.,"Jointly modeling deep video and compositional text to bridge vision and language in a unified framework", In Proceedings of AAAI Conference on Artificial Intelligence,2015 (7 pgs).
Yao et al.,"Describing videos by exploiting temporal structure", arXiv:1502.08029,2015 (23 pgs).
Young et al., "Form image descriptions to visual denotation: New similarity metrics for semantic inference over event descriptions", 2:67-78, 2014 (12 pgs).
Yu et al., "Learing to describe video with weak supervision by exploiting negative sentential information," In AAAI Conference on Artificial Intelligence,pp. 3855-3863, Jan. 2015 (9 pgs).
Park et al.,"Expressing an image stream with a sequence of natural sentences", In Advances in Neural Information Processing Systems, 2015 (9 pgs).
Ranzato et al.,"Sequence level training with recurrent neural networks", CoRR, abs/ 1511.06732,2015 (15 pgs).
Chen et al., "Learning a recurrent visual representation for image caption generation," CoRR, abs/1411.5654, 2014 (10pgs).
Office Action dated Oct. 16, 2017, issued by Korean Intellectual Property Office (KIPO), and the machine translation (10 pgs).
Venugopalan et al., "Translating Videos to Natural Language Using Deep Recurrent Neural Networks", <URL:https://arxiv.org/pdf/1412.4729.pdf>, Apr. 30, 2015 (11 pgs).
Li et al., "Summarization-based Video Caption via Deep Neural Networks", Proceedings of the 23rd ACM international conference on Multimedia, pp. 1191-1194, Oct. 13, 2015, (4 pgs).
Krishnamoorthy et al., "Generating natural-language video descriptions using text-mined knowledge," In AAAI Conference on Artificial Intelligence, pp. 541-547,2013 (7pgs).
LeCun et al., "Efficient backprop," In Neural Networks: Tricks of the Trade, p. 546, 1998 (44pgs).
Lee et al., "SAVE: A framework for semantic annotation of visual events," In Proceedings of the IEEE Conference on Computer Vision and Pattern Recognition Workshops, pp. 1-8, 2008.
Li et al., "A hierarchical neural autoencoder for paragraphs and documents," CoRR, abs/1506.01057, 2015 (10pgs).
Lin et al., "Hierarchical recurrent neural network for document modeling," pp. 899-907. Conference on Empirical Methods in Natural Language Processing, Sep. 2015 (9pgs).
Lin et al., "Microsoft COCO: common objects in context," CoRR, abs/1405.0312, 2014 (15 pgs).
Mao et al., "Deep captioning with multimodal recurrent neural networks (m-rnn)," ICLR, 2015 (14pgs).
Mao et al., "Learning like a child: Fast novel visual concept learning from sentence descriptions of images," CoRR, abs/1504.06692, 2015 (10 pgs).

(56) References Cited

PUBLICATIONS

Nair et al., "Rectified linear units improve restricted boltzmann machines," In ICML, pp. 807-814, 2010 (8pgs).

Hochreiter et al., "Long short-term memory," Neural Comput., 9(8):1735-1780, Nov. 1997 (32pgs).

Jegou et al., "Aggregating local image descriptors into compact codes," IEEE Trans. Pattern Anal. Mach. Intell., 34(9):704-1716, Sep. 2012 (8pgs).

Kalchbrenner et al., "Recurrent continuous translation models," Oct. 2013 (10pgs).

Karpathy et al., "Large-scale video classification with convolutional neural networks," In CVPR, 2014 (8pgs).

Khan et al., "Human Focused Video Description," In Proceedings of the IEEE International Conference on Computer Vision Workshops, pp. 1480-1487, 2011.

Khan et al., "Towards Coherent Natural Language Description of Video Streams," In Proceedings of the IEEE International Conference on Computer Vision Workshops, pp. 664-671, 2011.

Kiros et al., "Unifying visual-semantic embeddings with multimodal neural language models," CoRR, abs/1411.2539, 2014 (13pgs).

Kojima et al., Natural language description of human activities from video images based on concept hierarchy of actions. International Journal of Computer Vision, 50(2):171-184, 2002 (18pgs).

800

TABLE 1

|  | B@1 | B@2 | B@3 | B@4 | M | C |
|---|---|---|---|---|---|---|
| LSTM-YT [46] | - | - | - | 0.333 | 0.291 | - |
| S2VT [45] | - | - | - | - | 0.298 | - |
| NM-VDN [51] | - | - | - | 0.376 | 0.290 | - |
| TA [53] | 0.800 | 0.647 | 0.526 | 0.419 | 0.296 | 0.517 |
| LSTM-E [33] | 0.788 | 0.660 | 0.554 | 0.453 | 0.310 | 0.621 |
| h-RNN-$V_{gg}$ | 0.773 | 0.645 | 0.546 | 0.443 | 0.311 | 0.621 |
| h-RNN-C3D | 0.797 | 0.679 | 0.579 | 0.474 | 0.303 | 0.536 |
| h-RNN-(ours) | 0.815 | 0.704 | 0.604 | 0.499 | 0.326 | 0.658 |

TABLE 2

|  | B@1 | B@2 | B@3 | B@4 | M | C |
|---|---|---|---|---|---|---|
| CRF-T [36] | 0.564 | 0.447 | 0.332 | 0.253 | 0.260 | 1.248 |
| CRF-M [35] | 0.584 | 0.467 | 0.352 | 0.273 | 0.272 | 1.347 |
| LRCN [11] | - | - | - | 0.288 | - | - |
| h-RNN-$V_{gg}$ | 0.561 | 0.445 | 0.329 | 0.256 | 0.260 | 1.267 |
| h-RNN-DT | 0.557 | 0.451 | 0.346 | 0.274 | 10.261 | 1.400 |
| RNN-sent | 0.568 | 0.469 | 0.367 | 0.295 | 0.278 | 1.580 |
| h-RNN-(ours) | 0.608 | 0.496 | 0.385 | 0.305 | 0.287 | 1.602 |

|  | $\mathcal{PPL}$ |
|---|---|
| LM-sent | 2.037 |
| LM-hier | 1.881 |

SYSTEMS AND METHODS FOR VIDEO PARAGRAPH CAPTIONING USING HIERARCHICAL RECURRENT NEURAL NETWORKS

CROSS-REFERENCE TO RELATED APPLICATION

This application claims the priority benefit under 35 USC § 119(e) to commonly assigned U.S. Provisional Patent Application No. 62/248,232, filed on Oct. 29, 2015, entitled "Systems And Methods For Video Paragraph Captioning Using Hierarchical Recurrent Neural Networks," listing Haonan Yu, Jiang Wang, Zhiheng Huang, Yi Yang, and Wei Xu as inventors. The aforementioned patent document is incorporated by reference herein in its entirety.

A. TECHNICAL FIELD

The present disclosure relates generally to improving human-computer interactions, and more specifically to systems and methods for automating the captioning of videos.

B. BACKGROUND

An issue exists regarding the generation of captions for videos. The video captioning problem has been studied for over one decade ever since the first rule-based system on describing human activities with natural language. While some good results have been obtained, current methods focus on generating a single sentence for a video clip. It still remains largely unexplored how to generate multiple sentences or a paragraph for a long video.

Accordingly, what is needed are systems and methods that provide better captioning for videos.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

Figure ("FIG.") 1 shows some example sentences according to an embodiment of the present disclosure.

FIG. 8 show tables of sample results data according to embodiments of the present disclosure.

DETAILED DESCRIPTION OF THE PREFERRED EMBODIMENTS

Figure 1:
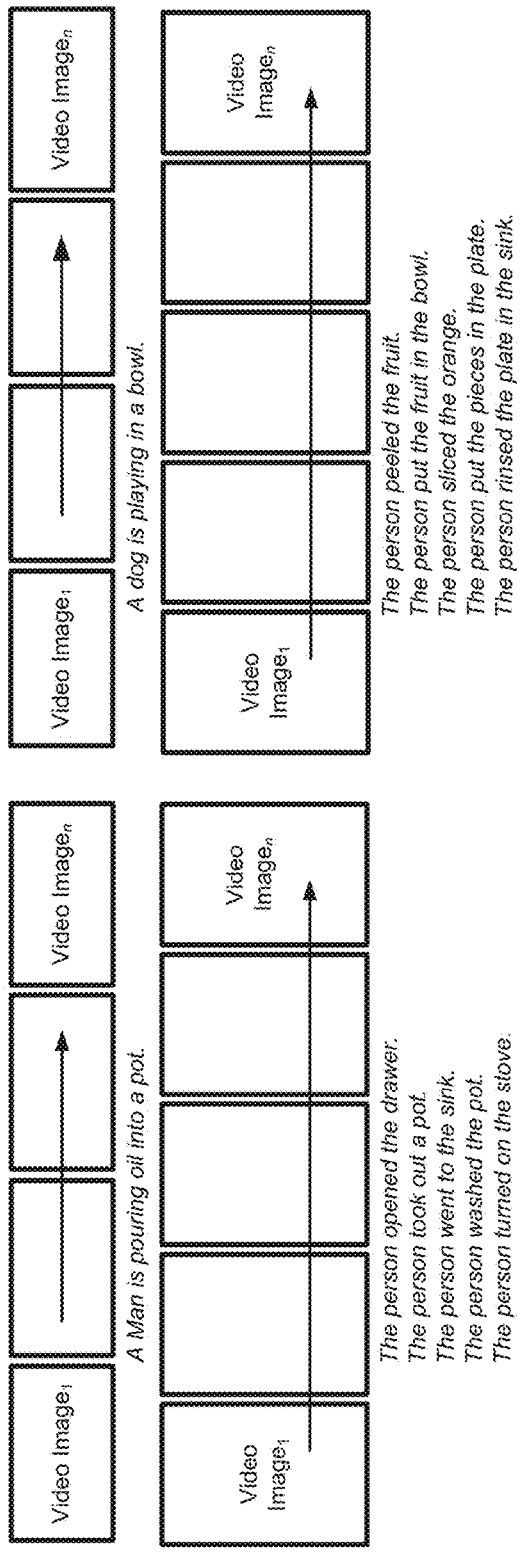

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

In this patent document, the problem of video captioning (i.e., generating one or multiple sentences to describe the content of a video) is considered. The given video could be as general as those uploaded to a website, or it could be as specific as cooking videos with fine-grained activities. This ability to generate linguistic description for unconstrained video is important because not only it is a critical step towards machine intelligence, but also it has many applications in daily scenarios such as video retrieval, automatic video subtitling, blind navigation improved indexing and searching, etc. FIG. 1 shows some example sentences generated according to an embodiment of the present disclosure.

The video captioning problem has been studied for over one decade ever since the first rule-based system on describing human activities with natural language. In a very limited setting, Kojima et al. [A. Kojima, T. Tamura, and K. Fukunaga. Natural language description of human activities from video images based on concept hierarchy of actions. *International Journal of Computer Vision*, 50(2):171-184, 2002] designed some simple heuristics for identifying video objects and a set of rules for producing verbs and prepositions. A sentence is then generated by filling predefined templates with the recognized parts of speech. Following their work, several succeeding approaches applied similar rule-based systems to datasets with larger numbers of objects and events, in different tasks and scenarios. With ad hoc rules, they manually establish the correspondence between linguistic terms and visual elements, and then analyze the relations among the visual elements to generate sentences. Among these methods, the most complex rule-based system supports a vocabulary of 118 lexical entries (including 48 verbs and 24 nouns).

To eliminate the tedious effort of rule engineering when the problem scales, some recent methods train statistical models for lexical entries, either in a fully or weakly supervised fashion. The statistical models of different parts of speech usually have different mathematical representations and training strategies. With most of the manual effort gone, the training process exposes these methods to even larger datasets (e.g., YouTubeClips and TACoS-MultiLevel) which contain thousands of lexical entries and dozens of hours of video. As a result, the video captioning task becomes much more challenging, and the generation performance of these methods is usually low on these large-scale datasets.

Since then, inspiring results have been achieved by a recent line of video-captioning work, which benefits from the rapid development of deep neural networks, especially Recurrent Neural Network (RNN). Applying RNN to translate visual sequence to natural language is largely inspired by the recent advances in Neural Machine Translation (NMT) in the natural language processing community. The idea is to treat the image sequence of a video as the "source text" and the corresponding caption as the target text. Given a sequence of deep convolutional features (e.g., VggNet, C3D, etc.) extracted from video frames, a compact representation of the video is first obtained by simple average pooling, weighted average pooling with an attention model, or taking the last output from an RNN encoder which summarizes the feature sequence. Then an RNN decoder accepts this compact representation and outputs a sentence of a variable length. While good results were obtained, these methods only focus on generating a single sentence for a short video clip. It still remains largely unexplored how to generate multiple sentences or a paragraph for a long video.

At least one of the motivations of generating multiple sentences is that most videos depict far more than just one event. However, the current state-of-the-art RNNs still lack the ability to generate a single very long sentence to convey rich semantics. Thus using only one short sentence to describe a semantically rich video usually yields uninformative and even boring results. For example, instead of saying the person sliced the potatoes, cut the onions into pieces, put the onions and potatoes into the pot, and turned on the stove, a method that is only able to produce one short sentence would probably say the person is cooking.

Inspired by the recent progress of document modeling in natural language processing, embodiments of a hierarchical-RNN framework for describing a long video with a paragraph comprising of multiple sentences is presented herein. One idea behind embodiments of the hierarchical framework is to exploit the temporal dependency among sentences in a paragraph, so that when producing the paragraph, the sentences are not generated independently. Instead, the generation of one sentence might be affected by the semantic context provided by the previous sentences. For example, in a video of cooking dishes, a sentence the person peeled the potatoes is more likely to occur, than the sentence the person turned on the stove, after the sentence the person took out some potatoes from the fridge. Towards this end, embodiments of the presented hierarchical framework comprise two generators—a sentence generator and a paragraph generator, in embodiments both of which use recurrent layers for language modeling. In embodiments, at the low level, the sentence generator produces single short sentences that describe specific time intervals and video regions. In embodiments, both temporal- and spatial-attention mechanisms are exploited to selectively focus on visual elements when generating a sentence. In embodiments, the embedding of the generated sentence is encoded by the output of the recurrent layer. At the high level, the paragraph generator takes the sentential embedding as input, and uses another recurrent layer to output the paragraph state, which is then used as the new initial state of the sentence generator (see Section C, below).

Figure 2:
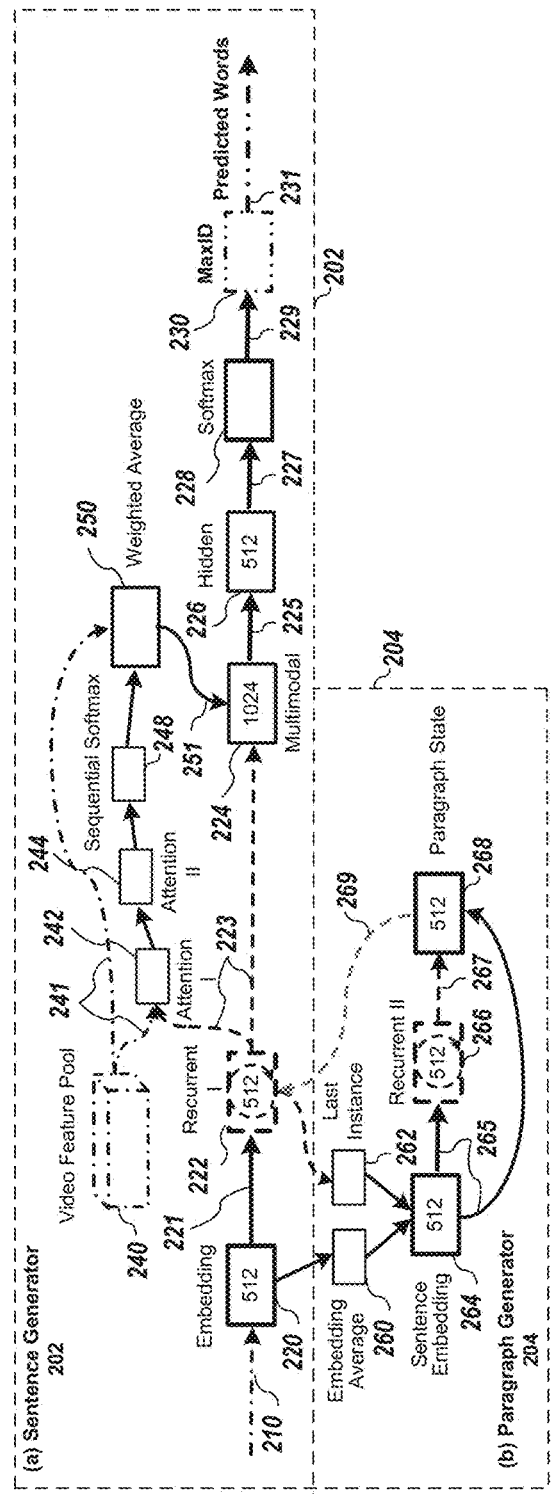
FIG. 2 illustrates am overall framework according to embodiments of the present disclosure.

FIG. 2 illustrates an overall framework according to embodiments of the present disclosure. An embodiment developed using this approach was evaluated on two public datasets: YouTubeClips and TACoS-MultiLevel; and it is shown that it significantly outperforms other state-of-the-art methods on both datasets.

B. Related Work

Neural Machine Translation (NMT). The methods for NMT in computational linguistics generally follow the encoder-decoder paradigm. An encoder maps the source sentence to a fixed-length feature vector in the embedding space. A decoder then conditions on this vector to generate a translated sentence in the target language. On top of this paradigm, several improvements were proposed. Some have proposed a soft attention model to do alignment during translation, so that their approach is able to focus on different parts of the source sentence when generating different translated words. Others employed a hierarchical RNN to model the hierarchy of a document.

Image Captioning with RNNs. The first attempt of visual-to-text translation using RNNs was seen in the work of image captioning, which can be treated as a special case of video captioning when each video has a single frame and no temporal structure. Because of this, image captioning only requires computing object appearance features, but not action/motion features. The amount of data handled by an image captioning method is much (dozens of times) less than that handled by a video captioning method. The overall structure of an image captioner (instance-to-sequence) is also usually simpler than that of a video captioner (sequence-to-sequence). While there have been quite a few large-scale datasets with high-quality annotation for image captioning (e.g., Flickr 30K and MS COCO), there are fewer for video captioning.

Video Captioning with RNNs. The very early video captioning method based on RNNs extends the image captioning methods by simply average pooling the video frames. Then the problem becomes exactly the same as image captioning. However, this strategy typically works only for short video clips where there is only one major event, usually appearing in one video shot from the beginning to the end. To avoid this issue, more sophisticated ways of encoding video features were proposed in later work, using either a recurrent encoder or an attention model. Although some embodiments of the sentence generator utilized herein may be considered related to Yao et al. [L. Yao, A. Torabi, K. Cho, N. Ballas, C. Pal, H. Larochelle, and A. Courville. Describing Videos by Exploiting Temporal Structure. In arXiv. arXiv:1502.08029, 2015], in that some embodiments also use attention mechanism to selectively focus on video features, key differences exist. For example, one difference between embodiments of the framework disclosed herein and theirs is that the framework additionally exploits spatial attention. Another difference is that after weighing video features with attention weights, the hidden state of the recurrent layer is not conditioned on the weighted features (see Section C.2, below). It is found in the experiments that embodiments of the framework disclosed herein yielded much better results.

C. Hierarchical RNN for Video Captioning

In embodiments, a paragraph generator is stacked with a sentence generator. In embodiments, the sentence generator comprises: 1) a Recurrent Neural Network (RNN) for language modeling; 2) a multimodal layer for integrating information from different sources; and 3) an attention model for selectively focusing on the input video features. In embodiments, the paragraph generator comprises another RNN which models the inter-sentence dependency. In embodiments, it receives the compact sentential representation encoded by the sentence generator, combines it with the paragraph history, and outputs a new initial state for the sentence generator. In embodiments, the RNNs exploited by the two generators incorporate the Gated Recurrent Unit (GRU) which is a simplification of the Long Short-Term Memory (LSTM) architecture. In the following, an RNN with a GRU (or the gated RNN) is first briefly review, and then embodiments of the framework are described in details.

1. Gated Recurrent Unit

A simple RNN may be constructed by adding feedback connections to a feedforward network that comprise three layers: the input layer x, the hidden layer h, and the output layer y. The network is updated by both the input and the previous recurrent hidden state as follows:

$$h^t = \phi(W_h x^t + U_h h^{t-1} + b_h)$$ (hidden state)

$$y^t = \phi(U_y h^t + b_y)$$ (output)

where W, U, and b are weight matrices and biases to be learned, and $\phi(\cdot)$ are element-wise activation functions.

While the simple RNN is able to model temporal dependency for a small time gap, it usually fails to capture long-term temporal information. To address this issue, the GRU is designed to adaptively remember and forget the past.

Figure 3:
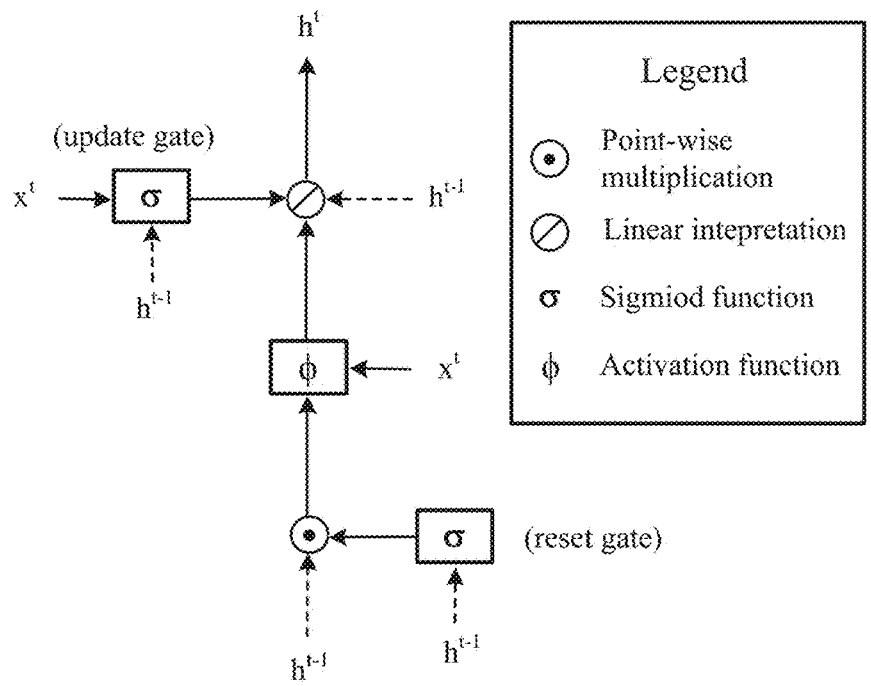
FIG. 3 illustrates an exemplary diagram of a Gated Recurrent Unit (GRU) according to embodiments of the present disclosure.

FIG. 3 illustrates an exemplary diagram of a Gated Recurrent Unit (GRU) according to embodiments of the present disclosure. Inside the unit 300, the hidden state $h^t$ is modulated by nonlinear gates. Specifically, let $\odot$ denote the element-wise multiplication of two vectors, the GRU computes the hidden state has:

$$r^t = \sigma(W_r x^t + U_r h^{t-1} + b_r)$$ (reset gate)

$$z^t = \sigma(W_z x^t + U_z h^{t-1} + b_z)$$ (update gate)

$$\tilde{h}^t = \phi(W_h x^t + U_h (r^t \odot h^{t-1}) + b_h)$$

$$h^t = z^t \odot h^{t-1} + (1-z^t) \odot \tilde{h}^t$$ (hidden gate)

where $\sigma(\cdot)$ are element-wise Sigmoid functions. The reset gate r determines whether the hidden state wants to drop any information that will be irrelevant in the future. The update gate z controls how much information from the previous hidden state will be preserved for the current state. To train a gated RNN, the parameters can be estimated by Backpropagation Through Time (BPTT) as in traditional RNN architectures.

2. Sentence Generator

The overall structure of an embodiment of a hierarchical RNN for video captioning is illustrated in FIG. 2. The black dash-dot illustration denotes the input to the framework, the black dash-dot-dot denotes the output, and black dash illustration denotes the recurrent components. The grey dashed arrow represents the reinitialization of the sentence generator with the current paragraph state. The structure 200 shown in FIG. 2 comprises a sentence generator 202 and a paragraph generator 204, which is described in Section 3 (below) for details. For simplicity, only a single video feature pool is drawn in the figure. In embodiments, both appearance and action features go through a similar attention process before they are fed into the multimodal layer.

In embodiments, the sentence generator operates at every time step when a one-hot input 210 (1-of-N encoding, where N is the vocabulary size) arrives at the embedding layer 220. The embedding layer 220 converts 305 the one-hot vector to a dense representation 221 in a lower dimensional space by multiplying it with an embedding table (512×N), of which each row is a word embedding to be learned. In embodiments, the resulting word embedding 221 is 310 then input to a first RNN 222 (i.e., the recurrent layer I). In embodiments, this gated recurrent layer has 512 dimensions and models the syntax of a language. It updates its hidden state every time a new word arrives, and encodes the sentence semantics in a compact form up to the words that have been fed in. In embodiments, the activation function $\phi$ of this recurrent layer is set to be the Rectified Linear Unit (ReLU), since it performs better than non-linear activation functions such as the Sigmoid according to observations.

As one branch, the output 223 of the recurrent layer I 222 is directed to the attention layers 242 and 244 to compute attention weights for the features in the video feature pool 240. In embodiments, the attention model is inspired by the recent soft-alignment method that has been successfully applied in the context of Neural Machine Translation (NMT), and was later adapted to video captioning by Yao et al. [L. Yao, A. Torabi, K. Cho, N. Ballas, C. Pal, H. Larochelle, and A. Courville. Describing Videos by Exploiting Temporal Structure. In arXiv. arXiv:1502.08029, 2015]. The difference between embodiments of the models herein and the one used by Yao et al. is that their model only focuses on temporal attention. In embodiments herein, spatial attention is additional included by computing features for multiple image patches at different locations on a video frame and pooling the features together. This improvement is important when objects are small and difficult to be localized on some datasets (e.g. TACoS-MultiLevel). In this case, whole-frame-based video features may fail to capture the object information and multiple object proposals may be needed for good performance (see Section E.2 for details). Let the features in the pool be denoted as $\{v_1, v_2, \ldots, v_{KM}\}$, where M is the video length and K is the number of patches on each frame. A set of weights $\{\beta_1^t, \beta_2^t, \ldots, \beta_{KM}^t\}$ for these features at each time step t are computed such that:

$$\Sigma_{m=1}^{KM}\beta_m^t=1.$$

To do so, in embodiments, an attention score $q_m^t$ is computed for each frame m, conditioned on the previous hidden state $h^{t-1}$:

$$q_m^t = w^T\phi(W_q v_m + U_q h^{t-1} + b_q)$$

where w, $W_q$, $U_q$, and $b_q$ are the parameters shared by all the features at all the time steps, and $\phi$ is set to the element-wise Scaled Hyperbolic Tangent (stanh) function: 1.7159·tan h(2x/3). In embodiments the above computation is performed by the attention layers I and II in section (a) of FIG. 2, where the attention layer I 242 projects the feature v and the hidden state h into a lower dimensional space whose dimension can range from 32 to 256. In embodiments, the attention layer II 244 then further compresses the activation of the projected vector into a scalar, one for each feature. After this, a sequential Softmax layer 248 may be set up to get the attention weights:

$$\beta_m^t = \exp(q_m^t) \bigg/ \sum_{m'=1}^{KM} \exp(q_{m'}^t)$$

Finally, in embodiments, a single feature vector may be obtained by weighted averaging in a weighted average block or module 250:

$$u^t = \Sigma_{m=1}^{KM}\beta_m^t v_m$$

In embodiments, the weighted average block or module 250 also receives the output 241 of the video feature pool 240 for the weighted averaging process.

The above process may be considered a sophisticated version of the temporal mean pooling. It allows the sentence generator 202 to selectively focus on a subset of the features during generation. Note that, in embodiments, while only one feature channel is shown in section (a) of FIG. 2, the sentence generator 202 in fact pumps features of several channels through the same attention process. Each feature channel may have a different set of weights and biases to be learned. In some experiments, two feature channels were employed, one for object appearance and the other one for action/motion (see Section E.2).

After the attention process, the weighted sums 251 of the video features are fed into the multimodal layer 224 which may, in embodiments, have 1024 dimensions. In embodiments, the multimodal layer 224 also receives the output 223 of the recurrent layer I 222, thus connecting the vision component with the language model. Suppose there are two video feature channels, of which the weighted features output by the attention model are $u_o^t$ and $u_a^t$ respectively. In embodiments, the multimodal layer maps the two features, together with the hidden state $h^t$ of the recurrent layer I, into a 1024 dimensional feature space and adds them up:

$$m^t = \phi(W_{m,o}u_o^t + W_{m,a}u_a^t + U_m h^t + b_m)$$

where $\phi$ is set to the element-wise stanh function. In embodiments, to reduce overfitting, a dropout with a drop rate of 0.5 is added to this layer.

In embodiments, the output 225 of the multimodal layer 224 is fed into a hidden layer 226, whose output 227 is fed into a Softmax layer 228 (see section (a) of FIG. 2), both with the element-wise stanh function as their activation functions. In the depicted embodiments, the hidden layer 226 has exactly the same dimensions (e.g., 512) with the word embedding layer 220, and the Softmax layer 228 has a dimension that is equal to the size of the vocabulary, which is dataset-dependent. Inspired, in part, by the transposed weight sharing scheme recently proposed by Mao et al. [J. Mao, W. Xu, Y. Yang, J. Wang, Z. Huang, and A. L. Yuille. Learning like a child: Fast novel visual concept learning from sentence descriptions of images. CoRR, abs/1504.06692, 2015], the projection matrix from the hidden layer 226 to the Softmax layer 228 may be set as the transpose of the word embedding table. It has been shown that this strategy allows the use of a word embedding layer with a much larger dimension due to the parameter sharing, and helps regularize the word embedding table because of the matrix transpose. In embodiments, as the final step of the sentence generator, a MaxID layer 230 picks the index that points to the maximal value in the output 229 of the Softmax layer 228. The index may then be treated as the predicted word ID 231. Note that during test/use phase, the predicted word may be fed back to the sentence generator again as the next input word 210. In embodiments, while in the training phase, the next input word is provided by the annotated sentence.

3. Paragraph Generator

Embodiments of the sentence generator 202 above handle one single sentence at a time. For the first sentence in the paragraph, the initial state of the recurrent layer I 222 is set to all zeros, i.e., $h^0=0$. However, any sentence after that will have its initial state conditioned on the semantic context of all its preceding sentences. This semantic context is encoded by an embodiment of the paragraph generator.

Figure 4:
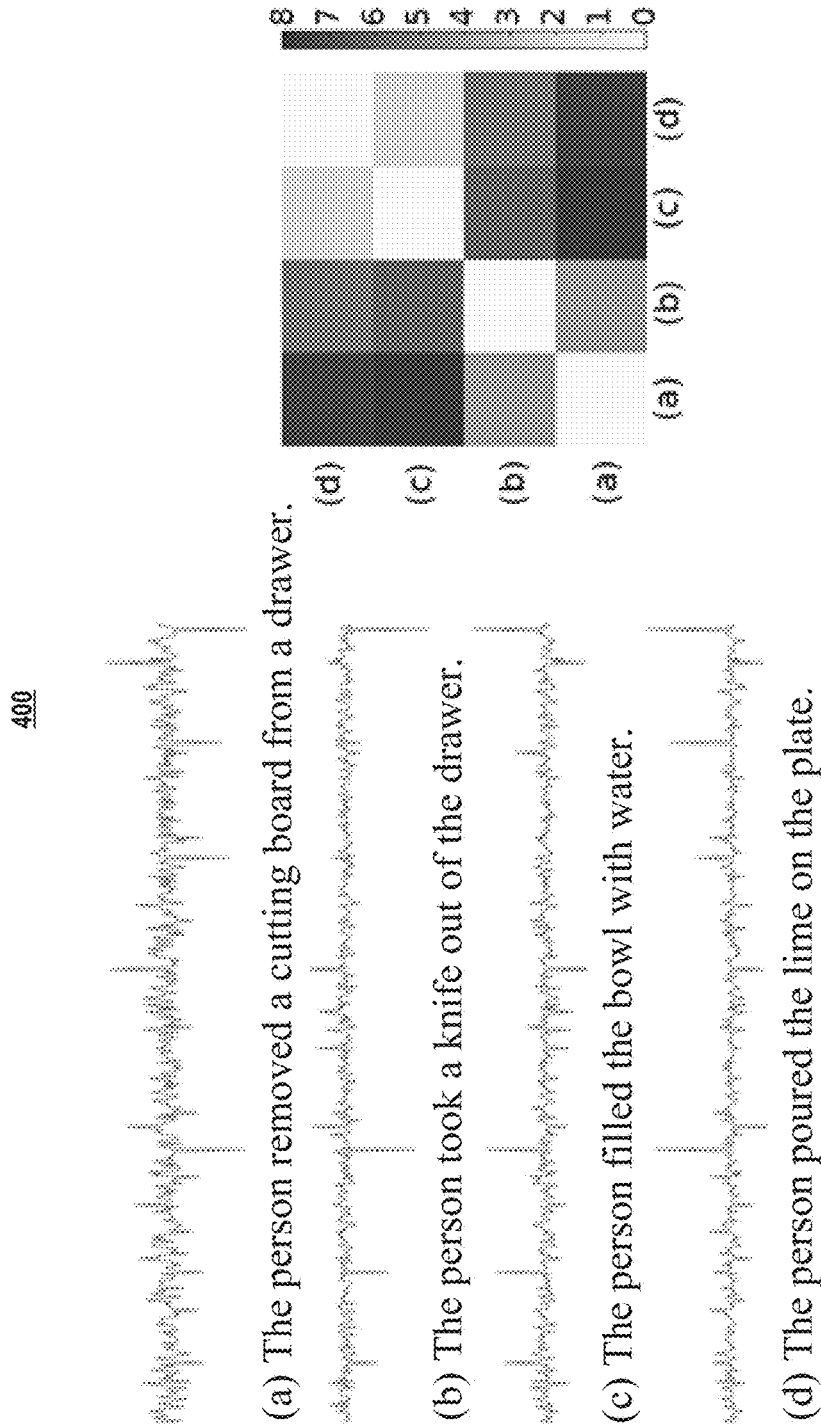
FIG. 4 depicts an exemplary flow diagram for the sentence generator according to embodiments of the present disclosure.

In embodiments, during the generation of a sentence, an embedding average layer (see section (b) in FIG. 2) 260 accumulates all the word embeddings of the sentence and takes an average to get a compact embedding vector. The average strategy is inspired by the QA embedding [A. Bordes, S. Chopra, and J. Weston. Question Answering With Subgraph Embeddings. CoRR, abs/1406.3676, 2014] in which questions and answers are both represented as a combination of the embeddings of their individual words and/or symbols. In embodiments, the last state 262 of the recurrent layer I 222 may be taken as a compact representation for the sentence, following the idea behind the Encoder-Decoder framework [Cho, B. van Merrienboer, ç. Gülçehre, F. Bougares, H. Schwenk, and Y. Bengio. Learning Phrase Representations Using RNN Encoder-Decoder For Statistical Machine Translation. *CoRR*, abs/1406.1078, 2014] in NMT. After that, in embodiments, the averaged embedding and the last recurrent state are concatenated together, fully connected to the sentence embedding layer 264 (e.g., 512 dimensions) with the stanh as the activation function. The output 265 of the sentence embedding layer 264 may be treated as the final sentence representation. Some examples of learned sentence embeddings are shown in FIG. 4. The left column in FIG. 4 shows four examples of learned sentence embeddings. Each 512 dimensional embedding is drawn as a curve. The right column of FIG. 4 shows the Euclidean distance between every two embeddings. A small distance indicates that two sentences have similar meanings. Notice how (a) and (b) are similar to each other due to sharing common keywords. Also note that even though (c) and (d) are quite different literally, the embodiment of present disclosure learns similar semantics for them from the video features. It can be seen that the sentence embedding layer of the current disclosure indeed encodes useful sentential information which is important for the later paragraph modeling.

In embodiments, the sentence embedding layer 264 is linked to a second gated RNN 266 (e.g. recurrently layer II, see section (b) in FIG. 2). The recurrent layer II 266 (e.g., 512 dimensions) operates whenever a full sentence goes through the sentence generator and the sentence embedding is produced by the sentence embedding layer. Thus, the two recurrent layers are asynchronous: while the recurrent layer I 222 keeps updating its hidden state at every time step, the recurrent layer II 266 only updates its hidden state when a full sentence has been processed. In embodiments, the recurrent layer II encodes the paragraph semantics in a compact form up to the sentences that have been fed in. Finally, a paragraph state layer 268 (e.g., 512 dimensions) may be set up to combine the hidden state 267 of the recurrent layer II and the output 265 of the sentence embedding layer 264. This paragraph state may be used as the initial hidden state when the recurrent layer I is reinitialized for the next sentence. It essentially provides the sentence generator with the paragraph history so that the next sentence is produced in the context. In embodiments, the paragraph state layer 268 also provides the current paragraph state as a re-initialization input 269 to the recurrent layer I 222 of the sentence generator 202.

Figure 5:
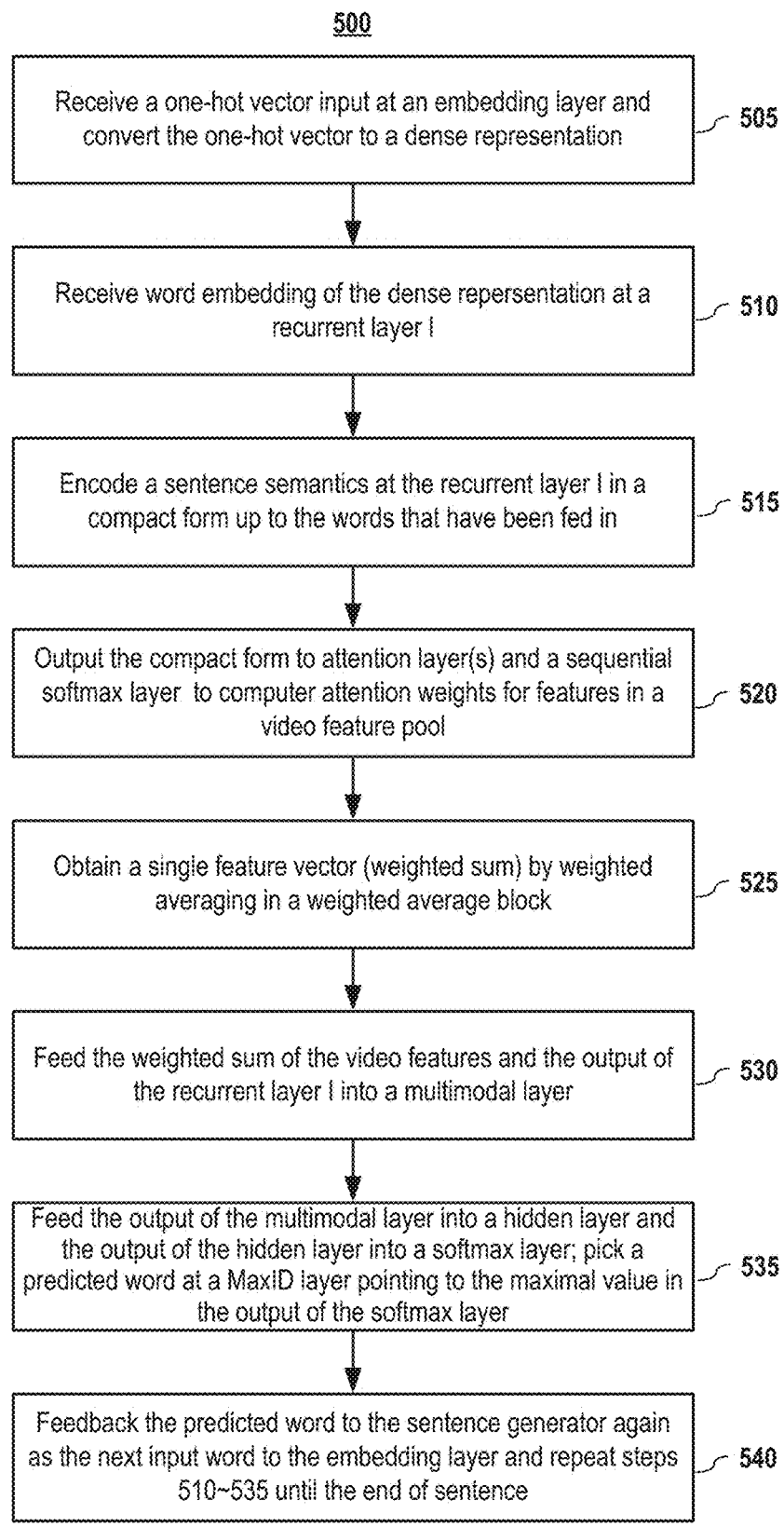
FIG. 5 depicts an exemplary flow diagram for the paragraph generator according to embodiments of the present disclosure.

FIG. 5 depicts an exemplary flow diagram for the sentence generator according to embodiments of the present disclosure. In embodiments, an embedding layer receives a one-hot vector input and converts the one-hot vector to a dense representation in a lower dimensional space (with each row as a word embedding to be learned) by multiplying it with an embedding table at step 505. In embodiments, the one-hot vector input is a sentence beginning symbol at the very beginning. In embodiments, the embedding table has dimension of 512×N. At step 510, the resulting word embedding is input to the recurrent layer I (the first RNN). In embodiments, the recurrent layer I has 512 dimensions, updates its hidden state every time a new word arrives, and encodes the sentence semantics in a compact form up to the words that have been fed in at step 515. The output of the recurrent layer I is directed to the attention layers and a sequential Softmax layer at step 520 to compute attention weights for the features in the video feature pool. At step 525, a single feature vector (or a weighted sum) is obtained by weighted averaging from the calculated attention weights in a weighted average module, which may also receive the output from the video feature pool for the weighted averaging process. At step 530, a multimodal layer receives the weighted sum of the video features as well as the output of the recurrent layer I, thus connecting the vision component with the language model. In embodiments, multimodal layer has 1024 dimensions. In embodiments, there are multiple video feature channels. The multimodal layer maps the multiple features together with the hidden state $h^t$ of the recurrent layer I into a 1024 dimensional feature space and adds them up. At step 535, the output of the multimodal layer is fed into a hidden layer, whose output is fed into a Softmax layer. Then a MaxID layer picks an index pointing to the maximal value in the output of the Softmax layer and treated the index as the predicted word ID. The predicted word is fed back to the embedding layer of the sentence generator again as the next input word in step 540 to repeat steps 510~535 until the end of the sentence. In embodiments, while in the training, the next input word is provided by the annotated sentence.

Figure 6:
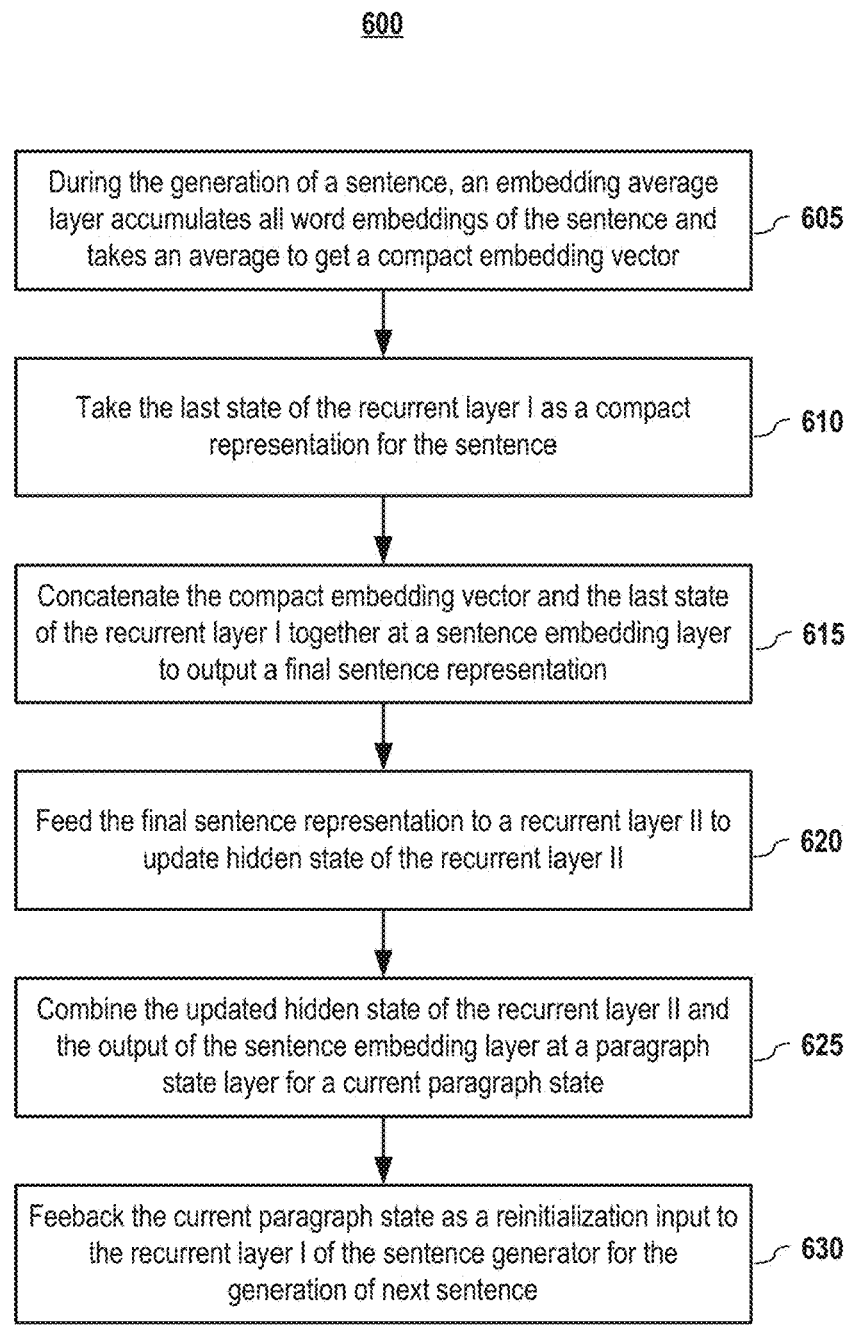
FIG. 6 shows some examples of learned sentence embeddings and their Euclidean distance, in accordance with embodiments of the present disclosure.

FIG. 6 depicts an exemplary flow diagram for the paragraph generator according to embodiments of the present disclosure. In embodiments, during the generation of a sentence, an embedding average layer accumulates all word embedding of the sentence and takes an average to get a compact embedding vector at step 605. In embodiments, at step 610, the last state of the recurrent layer I is taken as a compact representation for the sentence. At step 615, a sentence embedding layer concatenates the compact embedding vector and the last state of the recurrent layer I (the compact representation for the sentence) together to output a final sentence representation, which is fed to a recurrently layer II at step 620 to update the hidden state of the recurrently layer II. At step 625, a paragraph state layer combines the updated hidden state of the recurrently layer II and the output (the final sentence representation) of the sentence embedding layer for the generation of a current paragraph state. At step 630, the current paragraph state is fed back as a reinitialization input to the recurrent layer I of the sentence generator such that the recurrent layer I is reinitialized for the next sentence generation.

D. Training and Generation

In embodiments, all the components are trained in the hierarchical framework together from scratch with randomly initialized parameters. The activation value indexed by a training word $w_t^n$ in the softmax layer of the sentence generator may be treated as the likelihood of generating that word:

$$P(w_t^n | s_{1:n-1}, w_{1:t-1}^n, V)$$

given: 1) all the preceding sentences $s_{1:n-1}$ in the paragraph; 2) all the previous words $w_{1:t-1}^n$ in the same sentence n; and 3) the corresponding video V. The cost of generating that training word may then be defined as the negative logarithm of the likelihood. The cost of generating the whole paragraph $s_{1:N}$ (N is the number of sentences in the paragraph) may further be defined as:

$$\mathcal{PPL}(s_{1:N} | V) = -\sum_{n=1}^{N}\sum_{t=1}^{T_n} \log P(w_t^n | s_{1:n-1}, w_{1:t-1}^n, V) \Big/ \sum_{n=1}^{N} T_n$$

where $T_n$ is the number of words in the sentence n. The above cost is in fact the perplexity of the paragraph given the video. Finally, the cost function over the entire training set may be defined as:

$$\mathcal{PPL} = \sum_{y=1}^{Y}\left(\mathcal{PPL}(s_{1:N}^y | V_y) \cdot \sum_{n=1}^{N_y} T_n^y\right) \Big/ \sum_{y=1}^{Y}\sum_{n=1}^{N_y} T_n^y \quad (1)$$

where Y is the total number of paragraphs in the training set. In embodiments, to reduce overfitting, L2 and L1 regularization terms are added to the above cost function. Backpropagation Through Time (BPTT) may be used to compute the gradients of the parameters and Stochastic Gradient Descent (SGD) to find the optimum. In embodiments, for better convergence, the gradient may be divided by a running average of its recent magnitude according to an RMSPROP algorithm. A small learning rate 10-4 may be set to avoid the gradient explosion problem that is common in the training process of RNNs.

After the parameters are learned, the generation may be performed with Beam Search. Suppose that a beam width of L is used. The beam search process starts with the BOS (begin-of-sentence) symbol $w_{BOS}$ (i.e., $w_0$) which is treated as a 1-word sequence with zero cost at t=0. Assume that at any time step t, there are at most L t-word sequences that were previously selected with the lowest sequence costs (a sequence cost is the sum of the word costs in that sequence). For each of the t-word sequences, given its last word as input, the sentence generator calculates the cost of the next word $-\log P(w_t|w_{1:t-1} V)$ and also the sequence cost if the word is appended to the sequence. Then, from all the t+1-word sequences that are expanded from the existing t-word sequences, the top L ones with the lowest sequence costs are selected.

Of the new t+1-word sequences, any one that is a complete sentence (i.e., the last word $w_{t+1}$ is the EOS (end-of-sentence) symbol $w_{EOS}$) will be removed from the search tree. In embodiments, it will be put into the sentence pool if 1) there are less than J (J≤L) sentences in the pool, or 2) its sequence cost is lower than one of the J sentences in the pool. In the second case, the sentence with the highest cost may be removed from the pool, replaced by the new added sentence. Also, in embodiments, of the new t+1-word sequences, any one that has a higher sequence cost than all of the J sentences in the pool will be removed from the search tree. The reason is that expanding a word sequence monotonically increases its cost. In embodiments, the beam search process stops when there is no word sequence to be expanded in the next time step. In the end, J candidate sentences will be generated for post-processing and evaluation.

In embodiments, after this, the generation process goes on by picking the sentence with the lowest cost from the J candidate sentences. This sentence is fed into the paragraph generator, which reinitializes the sentence generator. The sentence generator may then accept a new BOS and again produces J candidate sentences. In embodiments, this whole process stops when the sentence received by the paragraph generator is the EOP (end-of-paragraph) which comprises the BOS and the EOS. Finally, a paragraph is obtained as a sequence of lists, each list with J sentences. In experiments, L=J=5. Excluding the calculation of visual features, the average computational time for the sentence generator to produce top 5 candidate sentences with a beam width of 5 is 0.15 seconds, on a single thread with CPU Intel® Core™ i7-5960X @ 3.00 GHz.

Figure 7:
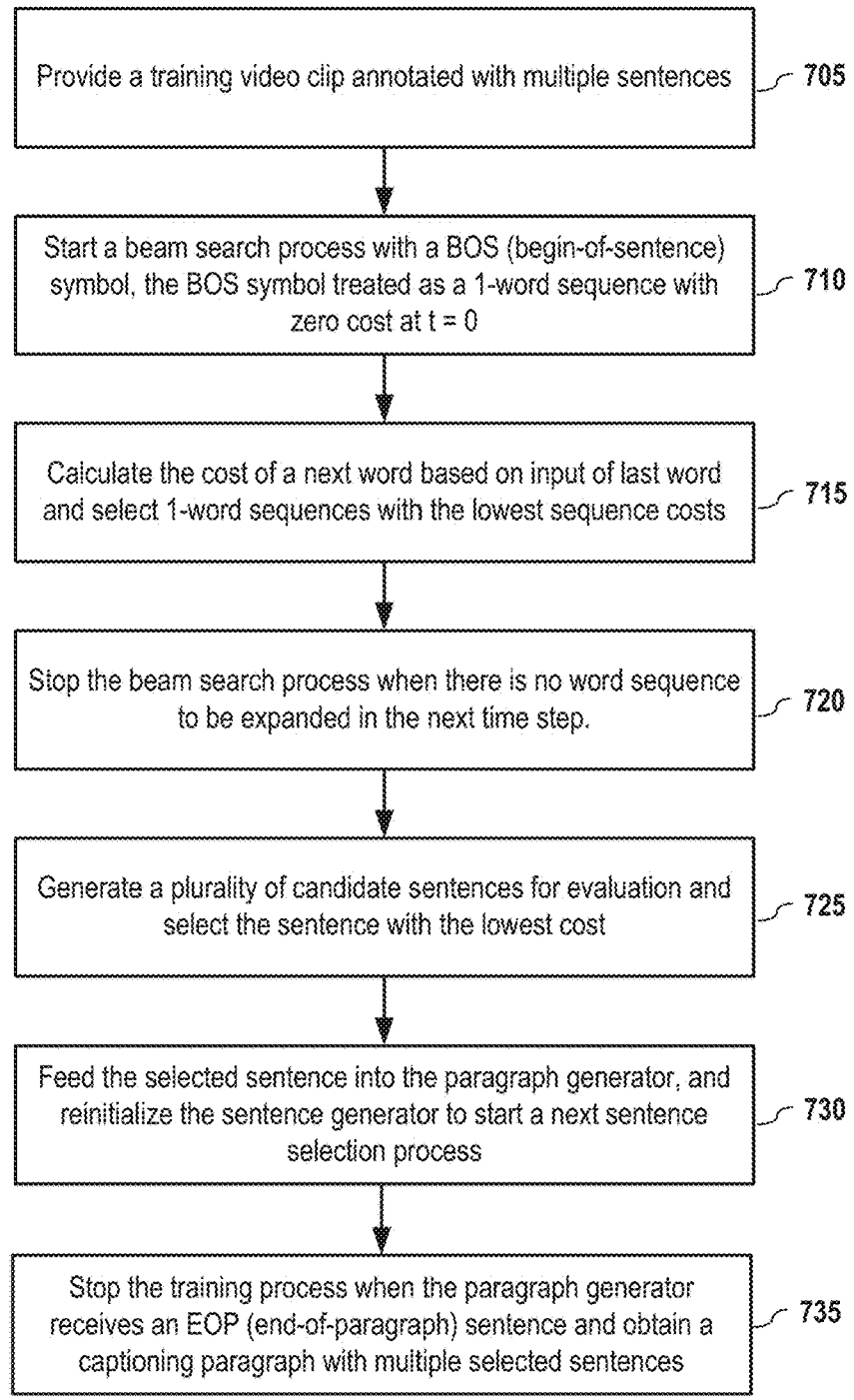
FIG. 7 depicts an exemplary flow diagram in a training process for captioning a video according to embodiments of the present disclosure.

FIG. 7 depicts an exemplary flow diagram in a training process for captioning a video according to embodiments of the present disclosure. At step 705, a training video clip annotated with multiple sentences is provided. In embodiments, the annotation sentences are parallel and independent in the temporal extent. At step 710, a beam search process starts with the BOS (begin-of-sentence) symbol. In embodiments, the BOS symbol is treated as a 1-word sequence with zero cost at t=0. At step 715, the cost of a next word is calculated based on input of last word and 1-word sequences with the lowest sequence costs are selected. At step 720, the beam search process stops when there is no word sequence to be expanded in the next time step. At step 725, a plurality of candidate sentences is generated for evaluation and the sentence with the lowest cost is selected. At step 730, the selected sentence is fed into the paragraph generator, and the sentence generator is reinitialized to start a next sentence selection process. Finally, at step 735, the training process stops when the paragraph generator receives an EOP (end-of-paragraph) sentence and a captioning paragraph is obtained with multiple selected sentences.

E. Experiments

It shall be noted that these experiments and results are provided by way of illustration and were performed under specific conditions using a specific embodiment or embodiments; accordingly, neither these experiments nor their results shall be used to limit the scope of the present invention.

1. Datasets

An embodiment is evaluated in accordance with the present disclosure on two benchmark datasets: YouTube-Clips and TACoS-MultiLevel.

YouTubeClips. This dataset consists of 1,967 short video clips (9 seconds on average) from YouTube. The video clips are open-domain, containing different people, animals, actions, scenarios, landscapes, etc. Each video clip is annotated with multiple parallel sentences by different turkers. There are 80,839 sentences in total, with about 41 annotated sentences per clip. Each sentence on average contains about 8 words. The words contained in all the sentences constitute a vocabulary of 12,766 unique lexical entries. The train and test splits provided by Guadarrama et al. [S. Guadarrama, N. Krishnamoorthy, G. Malkarnenkar, S. Venugopalan, T. D. R. Mooney, and K. Saenko. Youtube2text: Recognizing and describing arbitrary activities using semantic hierarchies and zero-shot recognition. In *ICCV'* 13 *Int. Conf. on Computer Vision* 2013, December 2013] were adopted, where 1,297 and 670 videos are used for training and testing respectively. It should be noted that while multiple sentences are annotated for each video clip, they are parallel and independent in the temporal extent, i.e., the sentences describe exactly the same video interval, from the beginning to the end of the video. As a result, this dataset is used as a special test case for the presented approach, when the paragraph length N=1.

TACoS-MultiLevel. This dataset consists of 185 long videos (6 minutes on average) filmed in an indoor environment. The videos are closed-domain, containing different actors, fine-grained activities, and small interacting objects in daily cooking scenarios. Each video is annotated by multiple turkers. A turker annotates a sequence of temporal intervals across the video, pairing every interval with a single short sentence. There are 16,145 distinct intervals and 52,478 sentences in total, with about 87 intervals and 284 sentences per video. The sentences were originally preprocessed so that they all have the past tense, and different gender specific identifiers were substituted with "the person." Each sentence on average contains about 8 words. The words contained in all the sentences constitute a vocabulary of 2,864 unique lexical entries. The train and test splits used by Rohrbach et al. [A. Rohrbach, M. Rohrbach, W. Qiu, A. Friedrich, M. Pinkal, and B. Schiele. Coherent multi-sentence video description with variable level of detail. In *German Conference on Pattern Recognition* (*GCPR*), September 2014] are adopted, where 143 and 42 videos are used for training and testing respectively. Note that the cooking activities in this dataset have strong temporal dependencies. Such dependency in a video is implied by the sequence of intervals annotated by a same turker on that video. Following Donahue et al. [J. Donahue, L. A. Hendricks, S. Guadarrama, M. Rohrbach, S. Venugopalan, K. Saenko, and T. Darrell. Long-term recurrent convolutional networks for visual recognition and description. CoRR, abs/1411.4389, 2014] and Rohrbach et al. [A. Rohrbach, M. Rohrbach,W. Qiu, A. Friedrich, M. Pinkal, and B. Schiele. Coherent multi-sentence video description with variable level of detail. In *German Conference on Pattern Recognition (GCPR)*, September 2014], the interval information is employed to align the sentences in the paragraph during both training and generation. This dataset is used as a general test case for the embodiment, when the paragraph length N>1.

2. Video Features

To model video object appearance, the pretrained VggNet (on the ImageNet dataset) was used for both datasets. Since the objects in YouTubeClips are usually prominent, one VggNet feature was extracted for each entire frame. This results in only temporal attention in the sentence generator (i.e., K=1 in Section C.2). For TACoSMultiLevel, the interacting objects are usually quite small and difficult to localize. To solve this problem, both Donahue et al. and Rohrbach et al. designed a specialized hand detector. Once the hand regions are detected, they extract features in the neighborhood to represent the interacting objects. Instead of trying to accurately locate hands which requires a lot of engineering effort as in their case, a simple routine may be relied upon to obtain multiple object proposals. In embodiments, an Optical Flow [G. Farnebäck, Two-frame motion estimation based on polynomial expansion. In *Proceedings of the 13th Scandinavian Conference on Image Analysis*, pages 363-370, 2003] was first used to roughly detect a bounding box for the actor on each frame. Then, in embodiments, K image patches were extracted of size 220×220 along the lower part of the box border, where every two neighboring patches have an overlap of half their size. It is observed is that these patches together have a high recall of containing the interacting objects while the actor is cooking. Finally, in embodiments, the VggNet feature was computed for each patch and pooled all the patch features. When K>1, the above routine leads to both temporal and spatial attention in the sentence generator. In practice, a small value of K (e.g., 3~5) is enough to yield good performance.

To model video motion and activities, in embodiments, the pretrained C3D (on the Sports-1M dataset) was used for YouTubeClips. The C3D net reads in a video and outputs a fixed-length feature vector every 16 frames. Thus, when applying the attention model to the C3D feature pool, in embodiments, K is set as 1 and M is divided by 16 (Section C.2). For the TACoS-MultiLevel dataset, since the cooking activities are fine-grained, the same model trained on sports videos does not work well. Alternatively, in embodiments, the Dense Trajectories [H. Wang, A. Kläser, C. Schmid, and C.-L. Liu. Action Recognition by Dense Trajectories. In *IEEE Conference on Computer Vision & Pattern Recognition*, pages 3169-3176, June 2011] for each video interval was computed and encoded them with the Fisher vector [H. Jégou, F. Perronnin, M. Douze, J. Sánchez, P. Pérez, and C. Schmid. Aggregating local image descriptors into compact codes. *IEEE Trans. Pattern Anal. Mach. Intell.*, 34(9):1704-1716, September 2012]. For the attention model, K=1 and M=1.

3. Evaluation Metrics

Three different evaluation metrics are employed: BLEU [K. Papineni, S. Roukos, T. Ward, and W. Jing Zhu. Bleu: a method for automatic evaluation of machine translation. In *ACL*, pages 311-318, 2002], METEOR [S. Banerjee and A. Lavie. METEOR: An automatic metric for MT evaluation with improved correlation with human judgments. In *Proceedings of the ACL Workshop on Intrinsic and Extrinsic Evaluation Measures for Machine Translation and/or Summarization*, pages 65-72, June 2005], and CIDEr [R. Vedantam, C. L. Zitnick, and D. Parikh. Cider: Consensus-based image description evaluation. *CoRR*, abs/1411.5726, 2014]. Because the YouTubeClips dataset was tested on by most existing video-captioning methods, the prior results of all the three metrics have been reported. The TACoS-MultiLevel dataset is relatively new and only the BLEU scores were reported in the previous work. The other metrics are computed for the comparison methods based on the generated sentences that come with the dataset. Generally, the higher the metric scores are, the better the generated sentence correlates with human judgment. The evaluation script provided by Chen et al. [X. Chen, H. Fang, T. Lin, R. Vedantam, S. Gupta, P. Dollár, and C. L. Zitnick. Microsoft COCO captions: Data collection and evaluation server. *CoRR*, abs/1504.00325, 2015] is used to compute scores on both datasets.

4. Results on YouTubeClips

The presented approach (h-RNN) on YouTubeClips are compared to six state-of-the-art methods: LSTM-YT [S. Venugopalan, H. Xu, J. Donahue, M. Rohrbach, R. J. Mooney, and K. Saenko. Translating videos to natural language using deep recurrent neural networks. CoRR, abs/1412.4729, 2014], S2VT [S. Venugopalan, M. Rohrbach, J. Donahue, R. J. Mooney, T. Darrell, and K. Saenko. Sequence to sequence—video to text. CoRR, abs/1505.00487, 2015], TA [L. Yao, A. Torabi, K. Cho, N. Ballas, C. Pal, H. Larochelle, and A. Courville. Describing Videos by Exploiting Temporal Structure. In *arXiv*. arXiv:1502.08029, 2015], and LSTM-E [Y. Pan, T. Mei, T. Yao, H. Li, and Y. Rui. Jointly modeling embedding and translation to bridge video and language. CoRR, abs/1505.01861, 2015]. To evaluate the importance of the presented video features, the results of two baseline methods: h-RNN-Vgg and h-RNN-C3D are also reported. The former uses only the object appearance feature and the latter uses only the motion feature, with other components of the presented framework unchanged. The evaluation results are shown in Table 1 in FIG. 7, where B, M, and C are short for BLEU, METEOR, and CIDEr respectively.

It can be seen that the presented approach performs much better than the comparison methods, in all the three metrics. The improvements on the most recent state-of-the-art method (i.e., LSTM-E) are (0.499-0.453)/0.453=10.15% in the BLEU@4 score, and (0.326-0.310)/0.310=5.16% in the METEOR score. Although TA also employs temporal attention, the presented approach produces much better results due, at least in part, to the fact that the hidden state of the presented RNN is not conditioned on the video features. Instead, the video features are directly input to the multi-modal layer. The presented approach also outperforms the two baseline methods by large margins, indicating that the video features are, in embodiments, important in the video captioning task.

5. Results on TACoS-MultiLevel

An embodiment of the presented approach on TACoS-MultiLevel is compared to three state-of-the-art methods: CRF-T [M. Rohrbach, W. Qiu, I. Titov, S. Thater, M. Pinkal, and B. Schiele. Translating video content to natural language descriptions. In *Proceedings of the IEEE International Conference on Computer Vision*, pages 433-440, 2013], CRF-M [A. Rohrbach, M. Rohrbach, W. Qiu, A. Friedrich, M. Pinkal, and B. Schiele. Coherent multi-sentence video description with variable level of detail. In *German Conference on Pattern Recognition (GCPR)*, September 2014], and LRCN [J. Donahue, L. A. Hendricks, S. Guadarrama, M. Rohrbach, S. Venugopalan, K. Saenko, and T. Darrell. Long-term recurrent convolutional networks for visual recognition and description. CoRR, abs/1411.4389, 2014]. Like above, the embodiment has two baseline methods h-RNN-Vgg and h-RNN-DT which use only the appearance and motion features respectively. Two other baseline methods (RNN-sent and RNN-cat) that do not have the hierarchy (i.e., uses only the sentence generator, but not the paragraph generator) were also added. RNN-sent is trained and tested on individual video clips that are segmented from the original 185 long videos according to the annotated intervals. The initial state of the sentence generator is set to zero for each sentence. As a result, sentences are trained and generated independently. RNN-cat initializes the sentence generator with zero only for the first sentence in a paragraph. Then the sentence generator maintains its state for the following sentences until the end of the paragraph. This concatenation strategy for training a paragraph has been exploited in a recent neural conversational model [see O. Vinyals, A. Toshev, S. Bengio, and D. Erhan. Show and tell: A neural image caption generator. *CoRR*, abs/1411.4555, 2014]. In embodiments, RNN-send and RNN-cat are used to evaluate the importance of ourhierarchical structure.

The results on TACoS-MultiLevel are shown in Table 2(a) in FIG. 7, where B, M, and C are short for BLEU, METEOR, and CIDEr respectively. The presented approach outperforms the state-of-the-art methods, including the very recently proposed one (i.e., LRCN) with an improvement of (0.305-0.292)/0.292=4.45% in the BLEU@4 score. Given that the presented tested embodiment strategy of extracting object regions is relatively simple compared to the sophisticated hand detector used in the previous methods (Section E.2), it is expected to have even better performance when object localization is improved. The tested embodiment method is also superior to all the baseline methods. Although RNN-cat models temporal dependency among sentences-by-sentence-level concatenation, it performs worse than the hierarchical architecture of the current disclosure. Again, it shows that both the video features and the hierarchical structure are, in embodiments, important. Listed below are some example paragraphs generated by the presented approach on TACoS-MultiLevel.

Example Set 1
 a. RNN-sent:
  i. The person entered the kitchen.
  ii. The person went to the refrigerator.
  iii. The person placed the cucumber on the cutting board.
  (INCORRECT)
  iv. The person rinsed the cutting board. (INCORRECT)
 b. h-RNN:
  i. The person walked into the kitchen.
  ii. The person went to the refrigerator.
  iii. The person walked over to the sink. (Correct)
  iv. The person rinsed the carrot in the sink. (Correct)
Example Set 2
 a. RNN-sent:
  i. The person took out a cutting board from the drawer.
  ii. The person got a knife and a cutting board from the drawer.
  (INCORRECT)
  iii. The person cut the ends off the cutting board.
 b. h-RNN:
  i. The person took out a cutting board.
  ii. The person got a knife from the drawer. (Correct)
  iii. The person cut the cucumber on the cutting board.

Note that some of the sentences produced by RNN-sent are incorrect, which can be compared to the ones generated by the embodiment of the h-RNN model in the corresponding time intervals. In the first example, the embodiment of the h-RNN model successfully captures the high likelihood of the event walk to the sink after the event open the refrigerator. In the second example, RNN-sent generates the event take the cutting board twice due to the fact that the sentences in the paragraph are produced independently. In contrast, the embodiment of the h-RNN model avoids this mistake.

6. Discussions and Additional Embodiments

It shall be noted that additional embodiments may be used. First, in some embodiments, the sentential information flows unidirectionally through the paragraph recurrent layer, from the beginning of the paragraph to the end, but not also in the reverse way. Misleading information may potentially be passed down when the first several sentences in a paragraph are generated incorrect. To address this issue, in embodiments, a bidirectional RNN may be used instead. Second, there may be discrepancy between the objective function used by training and the one used by generation. The training process predicts the next word given the previous words from ground truth, while the generation process conditions the prediction on the ones previously generated by itself. This issue may be amplified where the paragraph generator conditions on ground truth sentences during training but on generated ones during generation. In embodiments, to address this condition, Scheduled Sampling [S. Bengio, O. Vinyals, N. Jaitly, and N. Shazeer. Scheduled Sampling For Sequence Prediction With Recurrent Neural Networks. *CoRR*, abs/1506.03099, 2015] may be added into the training process, where one randomly selects between the true previous words and the words generated by the model.

F. System Embodiments

In embodiments, aspects of the present patent document may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 9:
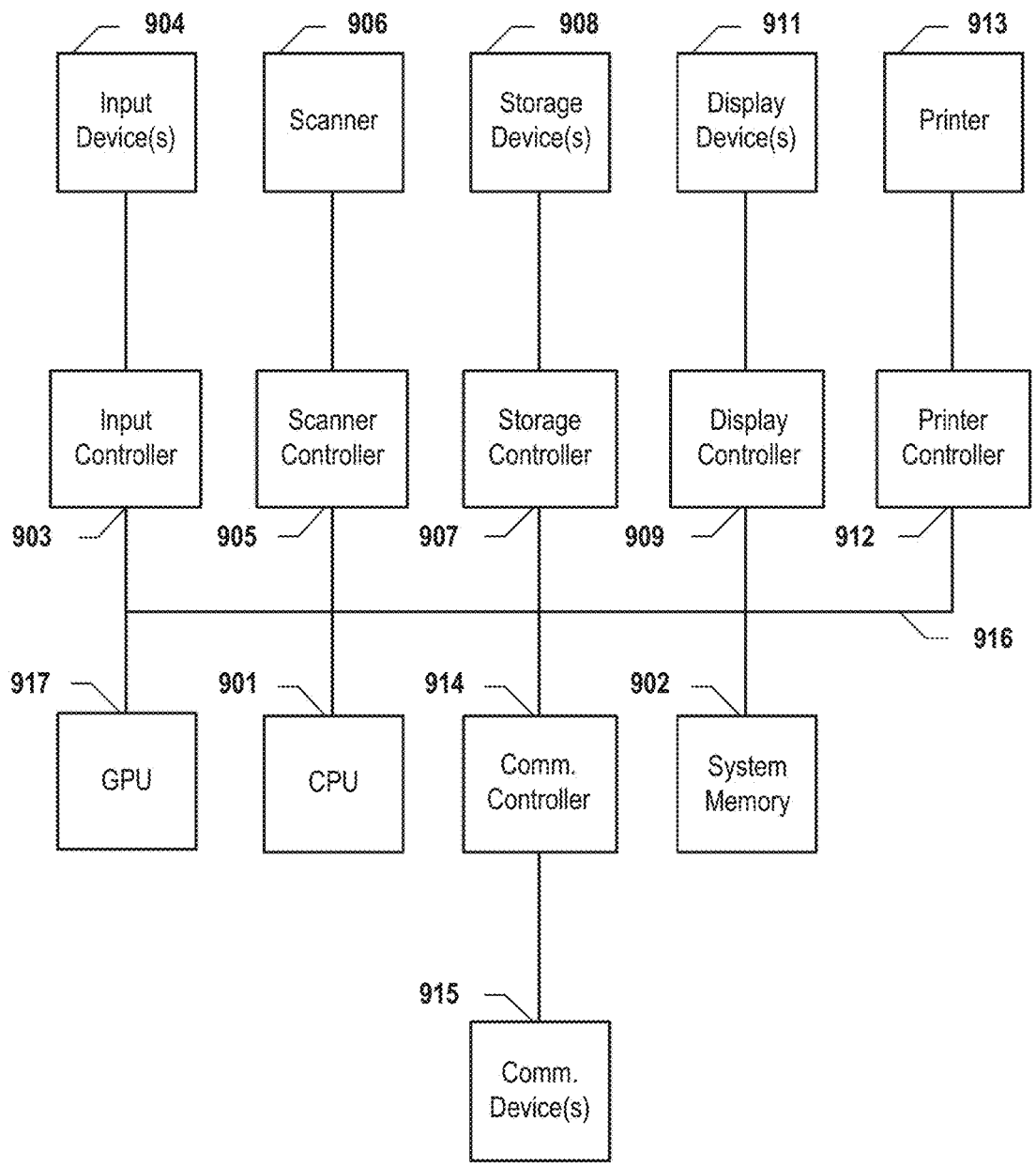
FIG. 9 depicts a simplified block diagram of a computing device/information handling system, in accordance with embodiments of the present disclosure.

FIG. 9 depicts a block diagram of a computing system 900 according to embodiments of the present invention. It will be understood that the functionalities shown for system 900 may operate to support various embodiments of a computing system—although it shall be understood that a computing system may be differently configured and include different components. As illustrated in FIG. 9, system 900 includes one or more central processing units (CPU) 901 that provides computing resources and controls the computer. CPU 901 may be implemented with a microprocessor or the like, and may also include one or more graphics processing units (GPU) 917 and/or a floating point coprocessor for mathematical computations. System 900 may also include a system memory 902, which may be in the form of random-access memory (RAM), read-only memory (ROM), or both.

A number of controllers and peripheral devices may also be provided, as shown in FIG. 9. An input controller 903 represents an interface to various input device(s) 904, such as a keyboard, mouse, or stylus. There may also be a scanner controller 905, which communicates with a scanner 906. System 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present invention. Storage device(s) 908 may also be used to store processed data or data to be processed in accordance with the invention. System 900 may also include a display controller 909 for providing an interface to a display device 911, which may be a cathode ray tube (CRT), a thin film transistor (TFT) display, or other type of display. The computing system 900 may also include a printer controller 912 for communicating with a printer 913. A communications controller 914 may interface with one or more communication devices 915, which enables system 900 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

It should be understood that various system components may or may not be in physical proximity to one another. For example, image/question input and answer output may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It shall also be noted that elements of the claims, below, may be arranged differently including having multiple dependencies, configurations, and combinations. For example, in embodiments, the subject matter of various claims may be combined with other claims.

The invention claimed is:

1. A computer-implemented method for automating describing a video with a paragraph comprising multiple sentences, the method comprising:
producing, using a sentence generator, multiple single sentences, each single sentence being generated sequentially and describing a specific time span and video region or regions within the video, the sentence generator comprising:
a word embedding layer word converting an input word into a word embedding;
a first recurrent layer for language modeling based at least on the word embedding, the first recurrent layer updating its hidden state when receiving a word embedding;
an attention model coupled to the first recurrent layer for selectively focusing on input video features in a video feature pool; and
a multimodal layer for integrating outputs from the first recurrent layer and the attention model to connect vision components with the language model;
using a paragraph generator to affect inter-sentence dependency for the sentence generator when producing a next sentence, the paragraph generator comprising:
a sentence embedding layer receiving word embeddings from the word embedding layer and current hidden state of the first recurrent layer to output a sentence embedding;
a second recurrent layer linked to the sentence embedding layer for inter-sentence dependency modeling, the second recurrent layer updating its hidden state when receiving a sentence embedding; and
a paragraph state component combining current hidden state of the second recurrent layer and the sentence embedding to generate of a current paragraph state as an initial hidden state when the first recurrent layer is reinitialized for next sentence generation.

2. The computer-implemented method of claim 1 wherein the first recurrent layer and second recurrent layer are asynchronous, the first recurrent layer updating its current hidden state at every time step and the second recurrent layer only updating its hidden state when a full sentence has been processed.

3. The computer-implemented method of claim 1 wherein the second recurrent layer operates whenever a full sentence goes through the sentence generator and the final sentence representation is produced by the sentence embedding layer.

4. The computer-implemented method of claim 1 wherein the attention model exploits both temporal- and spatial-attention mechanisms for selectively focusing on input video features.

5. The computer-implemented method of claim 1 wherein the attention model comprises:
at least one attention layer and a sequential Softmax layer to compute attention weights for features in the video feature pool; and
a weighted average module performing weighted averaging from the calculated attention weights for a single feature vector.

6. The computer-implemented method of claim 1 wherein the sentence generator further comprises a Softmax layer coupled to the multimodal layer and a MaxID layer selects an index that points to the maximal value in the output of the Softmax layer as a predicted word.

7. The computer-implemented method of claim 6 wherein the predicted word is fed back to the word embedding layer of the sentence generator as next input word.

8. The computer-implemented method of claim 1 wherein the sentence embedding layer receiving all word embeddings from the sentence generator via an embedding average layer, which accumulates all the word embeddings of the sentence currently generated and takes an average to get a compact embedding vector.

9. The computer-implemented method of claim 1 wherein the last hidden state of the first recurrent layer is taken as a compact representation for the sentence.

10. A computer-implemented method for generating multiple sentences to describe a video, the method comprising:
receiving a one-hot vector input at a word embedding layer and converting the input to a dense representation in a dimensional space with each row as a word embedding;
receiving the word embeddings at a first Recurrent Neural Network (RNN) for its hidden state updating and encoding a sentence semantics in a compact form up to the word embeddings that have been fed in;
outputting the compact form to at least one attention layer and a sequential softmax layer to compute attention weights for features in a video feature pool;
obtaining a weighted sum by weighted averaging in a weighted average block;
feeding the weighted sum and the output of the first RNN into a multimodal layer;
feeding the output of the multimodal layer into a hidden layer and then feeding the output of the hidden layer into a Softmax layer;
picking an index pointing to the maximal value in an output of the Softmax layer as a predicted word;
feeding back the predicted word to the word embedding layer again as a next input word;
repeating above steps until an end-of-sentence symbol received at the wording embedding layer to generate a complete sentence; and
receiving, at the first RNN, a reinitialization input from a paragraph generator such that the first RNN is reinitialized for a next sentence generation.

11. The computer-implemented method of claim 10 wherein the hidden layer has the same dimension as the word embedding layer.

12. The computer-implemented method of claim 10 wherein the attention weights for features in a video feature pool are calculated via at least one channel with each feature channel having a different set of weights and biases to be determined.

13. The computer-implemented method of claim 10 wherein the reinitialization input is generated at the paragraph generator based at least on word embeddings from the sentence generator and last hidden state of the first RNN.

14. The computer-implemented method of claim 10 wherein the at least one attention layer comprises a first attention layer projecting the hidden state of the first RNN and the features from the video feature pool into a dimensional space.

15. The computer-implemented method of claim 14 wherein the at least one attention layer comprises a second attention layer compressing the projected dimensional space into a scalar for each feature.

16. The computer-implemented method of claim 10 wherein when the first RNN receives the reinitialization input from the paragraph generator, the word embedding layer accepts a begin-of-sentence (BOS) symbol to start new sentence generation.

17. The computer-implemented method of claim 10 wherein the first RNN is trained in a hierarchical framework with randomly initialized parameters.

18. The computer-implemented method of claim 10 wherein the next input word is provided by annotated sentences of an annotated video clip in a training process.

19. A non-transitory computer-readable medium or media comprising one or more sequences of instructions which, when executed by one or more processors, causes the steps to be performed comprising:
- receiving, at a sentence embedding layer, word embeddings from a sentence generator and a current hidden state of a first gated Recurrent Neural Network (RNN) within a sentence generator;
- outputting a sentence representation from the sentence embedding layer;
- receiving, at a second gated RNN, the sentence representation for inter-sentence dependency modeling, the second gated RNN updating its hidden state whenever a full sentence goes through the sentence generator and the sentence representation is produced by the sentence embedding layer;
- combining the updated hidden state of the second gated RNN and the sentence representation at a paragraph state layer for the generation of a current paragraph state as a reinitialization input to the first RNN for next sentence generation; and
- repeating the above steps until the sentence embedding layer receives an end-of-paragraph (EOP) symbol.

20. The non-transitory computer-readable medium or media of claim 19 wherein the word embeddings from the sentence generator are accumulated and averaged to get an average embedding, the averaged embedding and the current hidden state of the first gated RNN being concatenated together in the sentence embedding layer.

* * * * *